United States Patent
Deshpande et al.

(10) Patent No.: US 11,102,165 B2
(45) Date of Patent: Aug. 24, 2021

(54) SYSTEMS AND METHODS TO OPERATE DEVICES WITH DOMAIN NAME SYSTEM (DNS) CACHES

(71) Applicant: Citrix Systems, Inc., Fort Lauderdale, FL (US)

(72) Inventors: Sandeep R. Deshpande, Fort Lauderdale, FL (US); Madhurima Nath, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 155 days.

(21) Appl. No.: 16/232,613

(22) Filed: Dec. 26, 2018

(65) Prior Publication Data
US 2020/0213265 A1 Jul. 2, 2020

(51) Int. Cl.
*H04L 29/12* (2006.01)

(52) U.S. Cl.
CPC ...... *H04L 61/1511* (2013.01); *H04L 61/2007* (2013.01); *H04L 61/6009* (2013.01); *H04L 61/6086* (2013.01)

(58) Field of Classification Search
CPC ............ H04L 61/1511; H04L 61/2007; H04L 61/6009; H04L 61/6086
See application file for complete search history.

(56) References Cited

U.S. PATENT DOCUMENTS

| | | | |
|---|---|---|---|
| 9,300,623 B1* | 3/2016 | Earl | H04L 61/1511 |
| 9,407,701 B2* | 8/2016 | Graessley | H04L 61/1511 |
| 9,887,956 B2* | 2/2018 | Akcin | H04L 61/1511 |
| 2017/0111309 A1* | 4/2017 | Halley | H04L 61/2007 |
| 2018/0026935 A1 | 1/2018 | Ripke et al. | |

OTHER PUBLICATIONS

International Search Report and Written Opinion for International Application No. PCT/US2019/068292, dated Feb. 20, 2020.
(Continued)

*Primary Examiner* — Esther B. Henderson
*Assistant Examiner* — Nazia Naoreen
(74) *Attorney, Agent, or Firm* — Foley & Lardner LLP

(57) ABSTRACT

Described embodiments provide systems and methods for invalidating a cache of a domain name system (DNS) information based on changes in internet protocol (IP) families. A mobile device having one or more network interfaces configured to communicate over a plurality of networks using a plurality of internet protocol (IP) families is configured to maintain a cache storing DNS information of one or more IP addresses of a first IP family of the plurality of IP families used by the mobile device for a connection to a first network of the plurality of networks. The device can detect a change in the connection of the mobile device from the first network using the first IP family to a second network using a second IP family different from the first IP family and flush at least the DNS information of one or more IP addresses of the first IP family from the cache to prevent use by the mobile device of an IP address that corresponds to an invalid cache entry.

20 Claims, 9 Drawing Sheets

(56) References Cited

OTHER PUBLICATIONS

Savolainen, T. et al: "Improved Recursive DNS Server Selection for Multi-Interfaced Nodes; rfc6731.txt", Improved Recursive DNS Server Selection for Multi-Interfaced Nodes; rfc6731.txt, Internet Engineering Task Force, IETF; Standard, Internet Society (ISOC) 4, Rue Des Falaises CH—1205 Geneva, Switzerland, Dec. 19, 2012 (Dec. 19, 2012), pp. 1-29, XP015086513, [retrieved on Dec. 19, 2012].
Wasserman, M. et al: "Current Practices for Multiple-Interface Hosts; rfc6419.txt", Current Practices for Multiple-Interface Hosts; rfc6419.txt, Internet Engineering Task Force, IETF; Standard, Internet Society (ISOC) 4. Rue Des Falaises CH—1205 Geneva, Switzerland, Nov. 22, 2011 (Nov. 22, 2011), pp. 1-21, XP015081364, [retrieved on Nov. 22, 2011].
International Preliminary Report on Patentability on International Appl. No. PCT/US2019/068292 dated Jul. 8, 2021.

\* cited by examiner

SYSTEMS AND METHODS TO OPERATE DEVICES WITH DOMAIN NAME SYSTEM (DNS) CACHES

FIELD OF THE DISCLOSURE

The present application generally relates to communicating network packets, including but not limited to systems and methods to operate computing devices using DNS caches based on changes in IP families or IP versions.

BACKGROUND

A Domain Name System (DNS) cache is a temporary database that can be maintained by a computer's operating system and contains records of all the recent visits and attempted visits to websites and other internet domains. DNS cache is a very efficient way to avoid having to complete an entire DNS lookup each time a device attempts to visit a site. By using a DNS cache, the process of completing an entire DNS lookup will only need to occur the first time the device visits the site and upon subsequent requests, the device will use the cached DNS information until the information expires or is flushed.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A computing device, such as a mobile device, can include multiple network interfaces through which the mobile device can communicate with other devices or servers via one or more networks. Different networks can use different Internet Protocol (IP) families or versions, for instance, IP version 4 or IP version 6, among others to facilitate this communication. The network interfaces of such computing devices can also communicate on networks using different IP families. When a device attempts to access a website, the device can use a domain name system (DNS) cache maintained on the device to retrieve an IP address of the website. The IP address stored in the DNS cache may become invalid if the network interface changes. In some embodiments, the network interface can change responsive to a change in a network condition of a network with which the device is connected. For example, if the device is connected to a cellular network and the device either moves to an area where the signal strength of the cellular network falls below a threshold or does not exist or for some reason, the cellular signal is no longer available. In another example, the device can be connected to a WiFi connection and the device moves to an area where the signal strength of the WiFi network falls below a threshold or does not exist or for some reason, the WiFi signal is no longer available (for instance, if the WiFi router is switched off or disconnected).

The present disclosure is directed to solving problems related to DNS cache entry validation. DNS cache entries are stored in a DNS cache of the device, which can be a table including a plurality of DNS cache entries. A DNS cache entry stored in the DNS cache may become invalid if the network interface of the device changes. In particular, the DNS cache entry can remain valid when the network interface of the device switches to a network that has the same IP family. For instance, if the network interface of the device switches from a network having an IP family of IPV4 to another network having an IP family of IPV4 or from a network having an IP family of IPV6 to another network having an IP family of IPV6, the DNS cache entries for the networks remain valid. However, the DNS cache entry can become invalid when the network interface switches from a network having an IP family of IPV4 to a network having an IP family of IPV6 or from a network having an IP family of IPV6 to a network having an IP family of IPV4. This is because a network interface that does not support a particular IP family cannot make a connection with an entity (for instance, a router or server) having an IP address corresponding to the particular IP family as the format of the IP address will not be supported by the network interface. Also, some networks can support both an IP family of IPV4 and IPV6. In some such cases, to minimize the number of DNS requests over the network and use the DNS cache as much as possible, there is a benefit to validating the DNS cache entries in the DNS cache during transitions of networks to ensure entries of the DNS cache are valid.

To address the problems related to DNS cache entry validation, the present disclosure describes systems and methods for determining a validity of DNS cache entries based on changes in IP families. IP families can correspond to different versions of the Internet Protocol. Each version of the Internet Protocol can describe an internetworking protocol for sharing resources using packet switching across network nodes. Internet Protocol version 6 (IPv6) is the most recent version of the Internet Protocol (IP), the communications protocol that provides an identification and location system for computers on networks and routes traffic across the Internet. IPv6 was developed by the Internet Engineering Task Force (IETF) to deal with the long-anticipated problem of IPv4 address exhaustion. IPv6 is an Internet Layer protocol for packet-switched internetworking and provides end-to-end datagram transmission across multiple IP networks, closely adhering to the design principles developed in the previous version of the protocol, Internet Protocol Version 4 (IPv4).

The present disclosure provides systems and methods for DNS cache entry validation for mobile devices, which can efficiently determine whether the DNS cache entry is valid or not when the device moves from one network to another. With this method, the unnecessary cost of DNS lookups by making a network request can be avoided and invalid DNS entry is flushed as needed. Thus, computing resources can be conserved or otherwise more efficiently applied when operating the device of the present disclosure.

In particular, the present disclosure describes devices that can be configured to detect the change in a network interface of the device and responsive to the change in the network interface, check whether the DNS cache entry is valid. Doing so can avoid experiencing performance issues. For instance, invalidating the DNS cache entry when the DNS cache entry is still valid can cause performance issues because doing so would require the device to perform a DNS lookup over the network when not needed. Similarly, using an invalid DNS cache entry can potentially cause the network request to fail or otherwise cause delays in situations when an IP address of a different IP family is used on a network, for instance, when an IPV6 address is used on an IPV4 network or vice-versa.

The present disclosure describes systems and methods that reduce the number of DNS cache misses, while also performing DNS cache invalidation. A cache miss is a state where the data requested for processing by a component or application is not found in the cache memory. It causes execution delays by requiring the program or application to fetch the data from other cache levels or the main memory. As such, a DNS cache miss corresponds to a situation that arises when a request for information from the DNS cache cannot be found in the DNS cache. In some embodiments described herein, DNS cache miss will occur at most once when there is a change of network interface or a change of IP family on a network interface that supports multiple IP families.

According to aspects of the present disclosure, the systems and methods described herein can be configured to cause a device to identify a change in a network interface of the device or a change in an IP family and responsive to determining that a change in the IP family satisfies a cache flushing policy, causing the device to flush the DNS cache or at least one or more entries of the DNS cache in accordance with the DNS cache flushing policy. The device can be configured to determine if there's a change in network state of the device. The network state can correspond to a change of state of one or more network interfaces, for example, from active to passive or primary to secondary, or if the IP family used by the network interface changes from a first IP family to a second IP family or vice versa. If there is a change in the network state of the device, the device can validate the cache entry to avoid performing an unnecessary DNS look up on the network. Furthermore, with network interfaces of devices capable of supporting multiple IP families, such as both IPV4 and IPV6, there is an additional challenge to validate the DNS cache or respective DNS cache entries of the DNS cache when on a network interface that supports both the IP families. This may be the case because the network interface may have to check IP addresses of two different IP families instead of one or because there is an additional determination to identify which IP family is being used by the device. The present disclosure describes systems and methods that can validate DNS cache entries and update the DNS cache entry and the DNS cache accordingly.

In some embodiments, a device can be configured to retrieve all the routable IP addresses for both a first network interface, for example, a WiFi network interface and a second network interface, for example, a cellular network interface. If the device is connected to a network via the WiFi interface and if the cellular interface is found, the device is configured to disregard the IP address and IP family of the cellular interface as the WiFi network interface is given preference over the cellular network interface. The device is configured to assign, designate or otherwise consider the WiFi network interface to be the active interface.

Furthermore, if a network interface supports both the IP families (i.e. IPV4 and IPV6), then it can be difficult to determine which IP family is being used. In that case, the device can be configured to always flush the DNS cache a single time to clear all entries of the DNS cache. As soon as the network interface stops supporting one of the IP families, the device can be configured to detect that the network interface stopped supporting one of the IP families and further be configured to flush the DNS cache of at least those entries related to that IP family.

In the case where the network interface changes but the IP family remains the same (i.e., change from Wifi_IPV4 to Cellular_IPV4 or change from Wifi_IPV6 to Cellular_IPV6 and vice-versa), the device is configured to not flush the DNS cache because the cached DNS IP family (or DNS cache entries belonging to the IP family) is still consistent with the routable IP family.

In one aspect, this disclosure is directed to a system. The system may include a mobile device having one or more network interfaces configured to communicate over a plurality of networks using a plurality of interne protocol (IP) families is configured to maintain a cache storing DNS information of one or more IP addresses of a first IP family of the plurality of IP families used by the mobile device for a connection to a first network of the plurality of networks. The device can detect a change in the connection of the mobile device from the first network using the first IP family to a second network using a second IP family different from the first IP family and flush at least the DNS information of one or more IP addresses of the first IP family from the cache to prevent use by the mobile device of an IP address that corresponds to an invalid cache entry.

In some embodiments, the first network uses a first signal type of one of cellular or wireless and the second network uses a second signal type different than the first signal type used by the first network. In some embodiments, the plurality of network interfaces includes a cellular network interface and a wireless network interface. In some embodiments, the wherein the plurality of IP families comprises at least IP version 4 and IP version 6.

In some embodiments, the device is further configured to detect a switch from using a first network interface of the plurality of network interfaces to a second network interface of the plurality of network interfaces. In some embodiments, the device is further configured to maintain entries in the cache in response to detecting that an IP family used by the second network interface remained the same as an IP family used by the first network interface between the switch from using the first network interface to the second network interface. In some embodiments, wherein to detect a change from the device using the first IP family to the second IP family, the device is further configured to detect that the first IP family used by the first network interface changed to the second IP family used by the second network interface between the switch from using the first network interface to the second network interface.

In some embodiments, the device is further configured to determine the first IP family used by the first network interface responsive to a first operating system call to determine the properties of the first network interface. The device can further be configured to determine the second IP family used by the second network interface responsive to a second operating system call to determine the properties of the second network interface.

In another aspect, this disclosure is directed to a method. In some embodiments, the method can be a method of invalidating a cache of a domain name system (DNS) information based on changes in internet protocol (IP) families. A mobile device having one or more network interfaces configured to communicate over a plurality of networks using a plurality of internet protocol (IP) families can maintain a cache storing DNS information of one or more IP addresses of a first IP family of the plurality of IP families used by the mobile device for a connection to a first network of the plurality of networks. The device can detect a change in the connection of the mobile device from the first network using the first IP family to a second network using a second IP family different from the first IP family and flush at least the DNS information of one or more IP addresses of the first IP family from the cache.

In some embodiments, the first network uses a first signal type of one of cellular or wireless and the second network uses a second signal type different than the first signal type used by the first network. In some embodiments, the plurality of network interfaces includes a cellular network interface and a wireless network interface. In some embodiments, the wherein the plurality of IP families comprises at least IP version 4 and IP version 6.

In some embodiments, the device is further configured to detect a switch from using a first network interface of the plurality of network interfaces to a second network interface of the plurality of network interfaces. In some embodiments, the device is further configured to maintain entries in the cache in response to detecting that an IP family used by the second network interface remained the same as an IP family used by the first network interface between the switch from using the first network interface to the second network interface. In some embodiments, wherein to detect a change from the device using the first IP family to the second IP family, the device is further configured to detect that the first IP family used by the first network interface changed to the second IP family used by the second network interface between the switch from using the first network interface to the second network interface.

In some embodiments, the device is further configured to determine the first IP family used by the first network interface responsive to a first operating system call to determine the properties of the first network interface. The device can further be configured to determine the second IP family used by the second network interface responsive to a second operating system call to determine the properties of the second network interface.

Another aspect provides a non-transitory computer readable medium storing program instructions. The program instructions may cause one or more processors to maintain, on a mobile device having one or more network interfaces configured to communicate over a plurality of networks using a plurality of interne protocol (IP) families, a cache storing DNS information of one or more IP addresses of a first IP family of the plurality of IP families used by the mobile device for a connection to a first network of the plurality of networks. The program instructions may cause one or more processors to detect a change in the connection of the mobile device from the first network using the first IP family to a second network using a second IP family different from the first IP family and flush at least the DNS information of one or more IP addresses of the first IP family from the cache to prevent use by the mobile device of an IP address that corresponds to an invalid cache entry.

In some embodiments, the program instructions may cause the one or more processors to detect a switch from using a first network interface of the plurality of network interfaces to a second network interface of the plurality of network interfaces.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
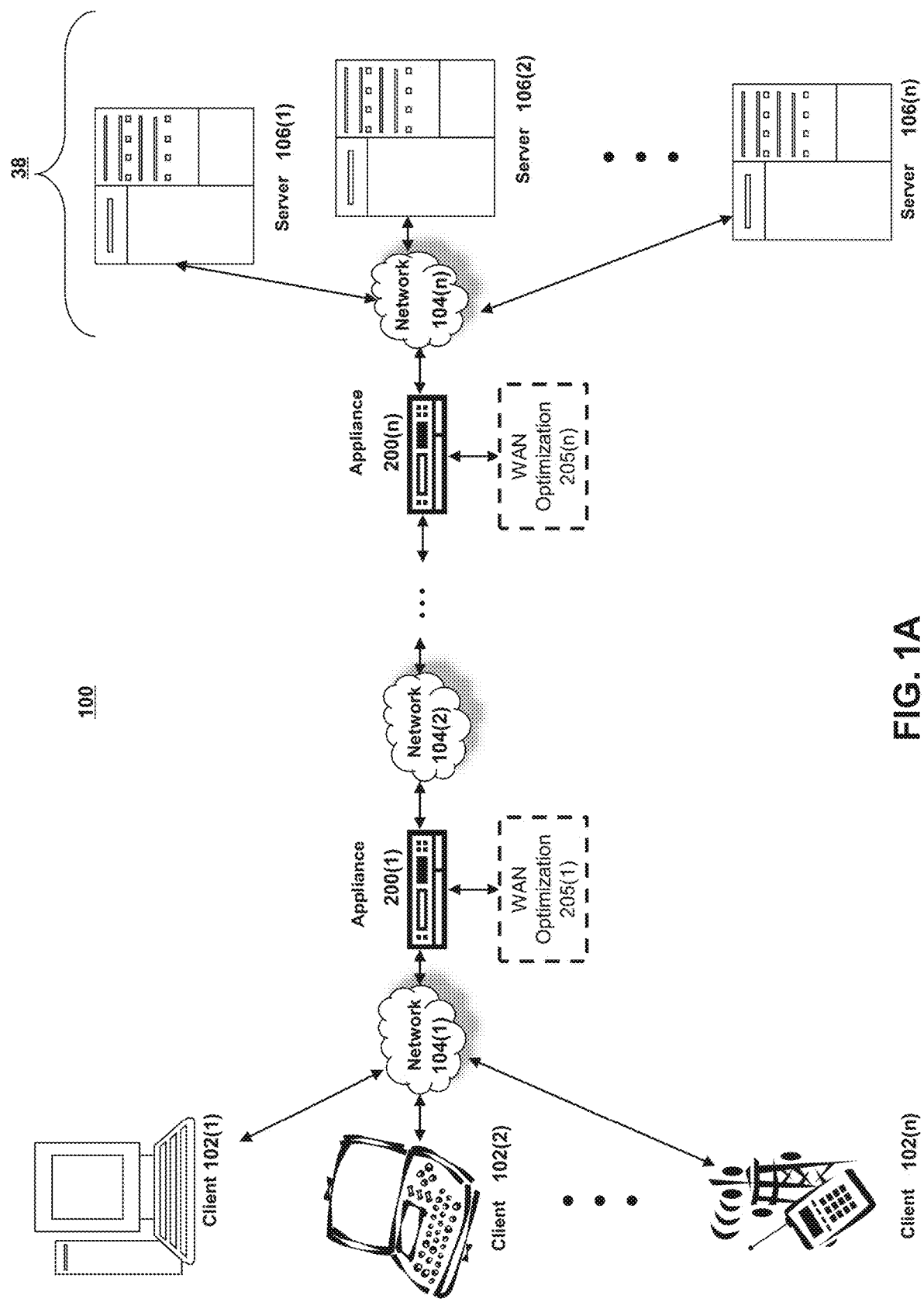
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for invalidating domain name system (DNS) cache entries based on changes in internet protocol (IP) families.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
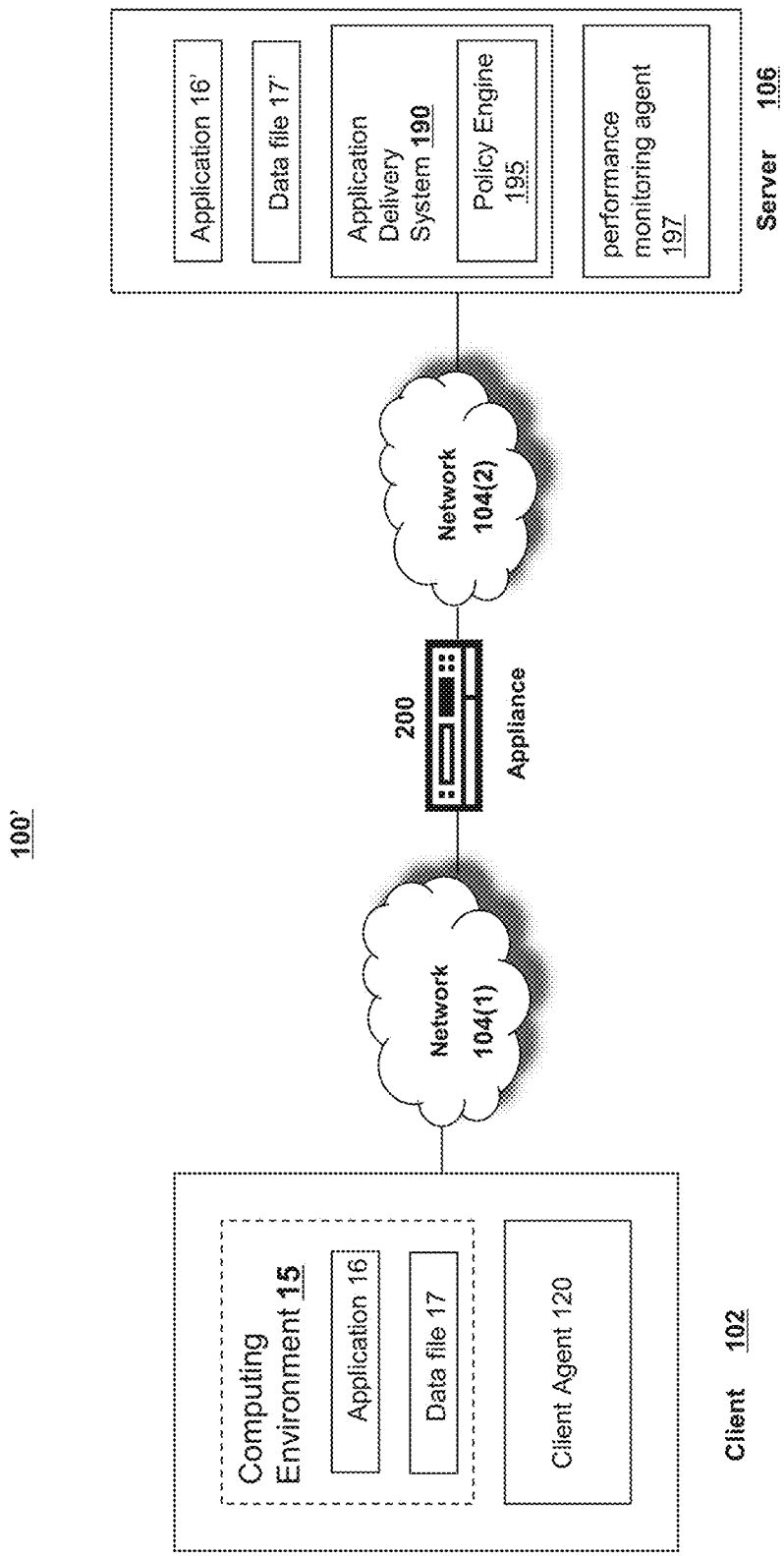
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name System (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
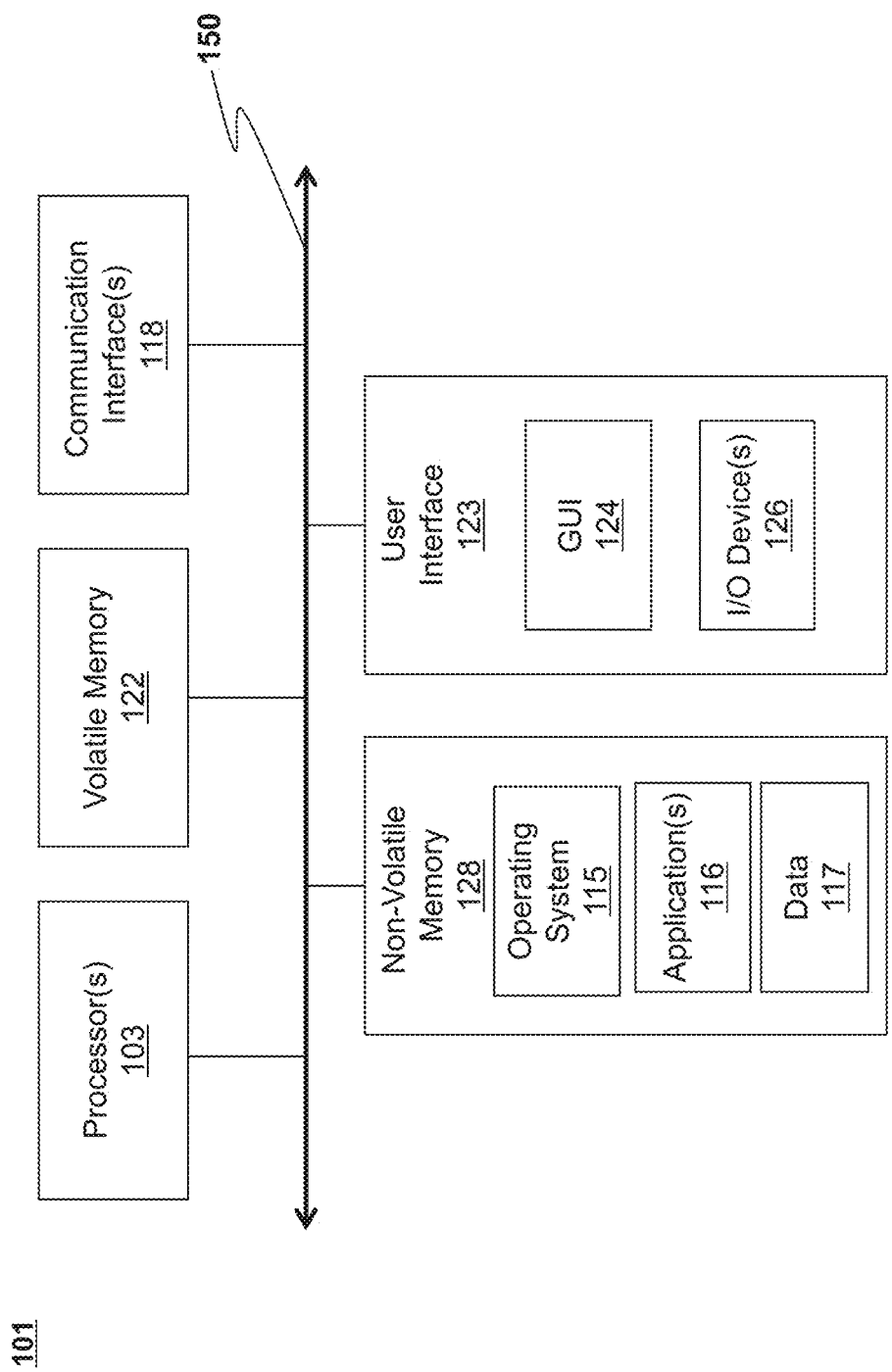
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla, the teachings of which are hereby incorporated herein by reference.

B. Appliance Architecture

Figure 2:
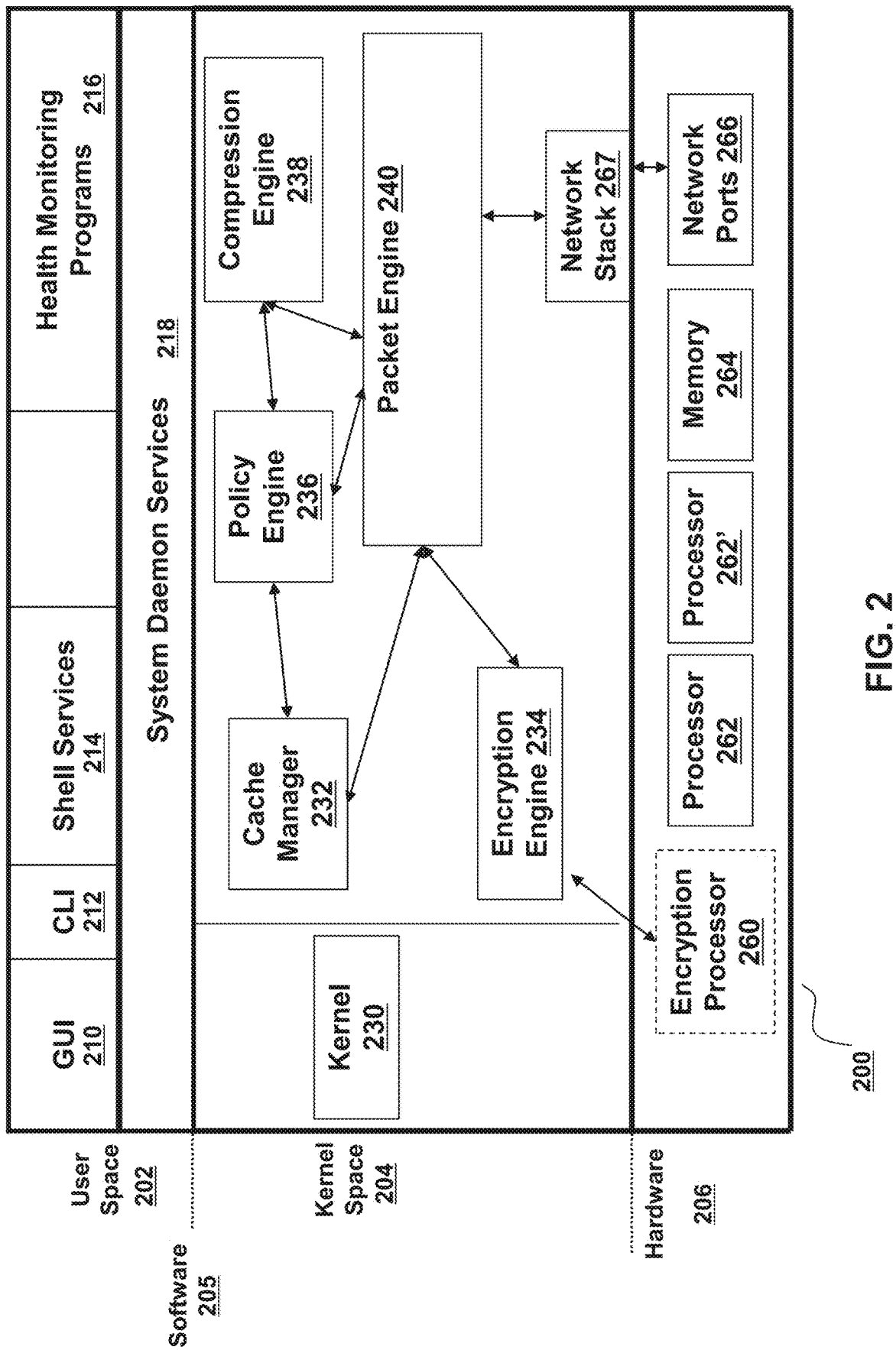
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla, the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
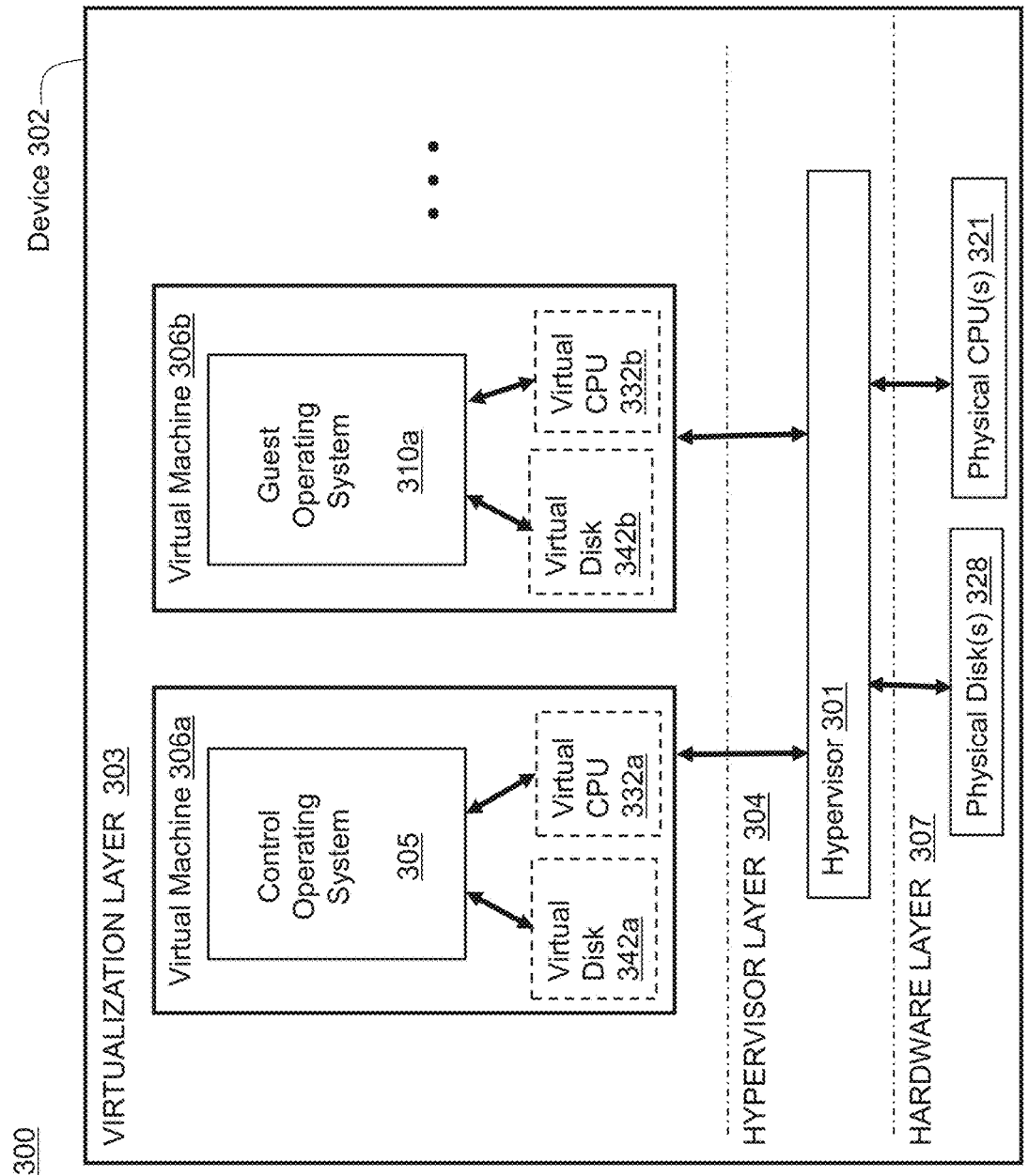
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla, the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla, the teachings of which are hereby incorporated herein by reference.

D. Systems and Methods for Providing a Distributed Cluster Architecture

Figure 4:
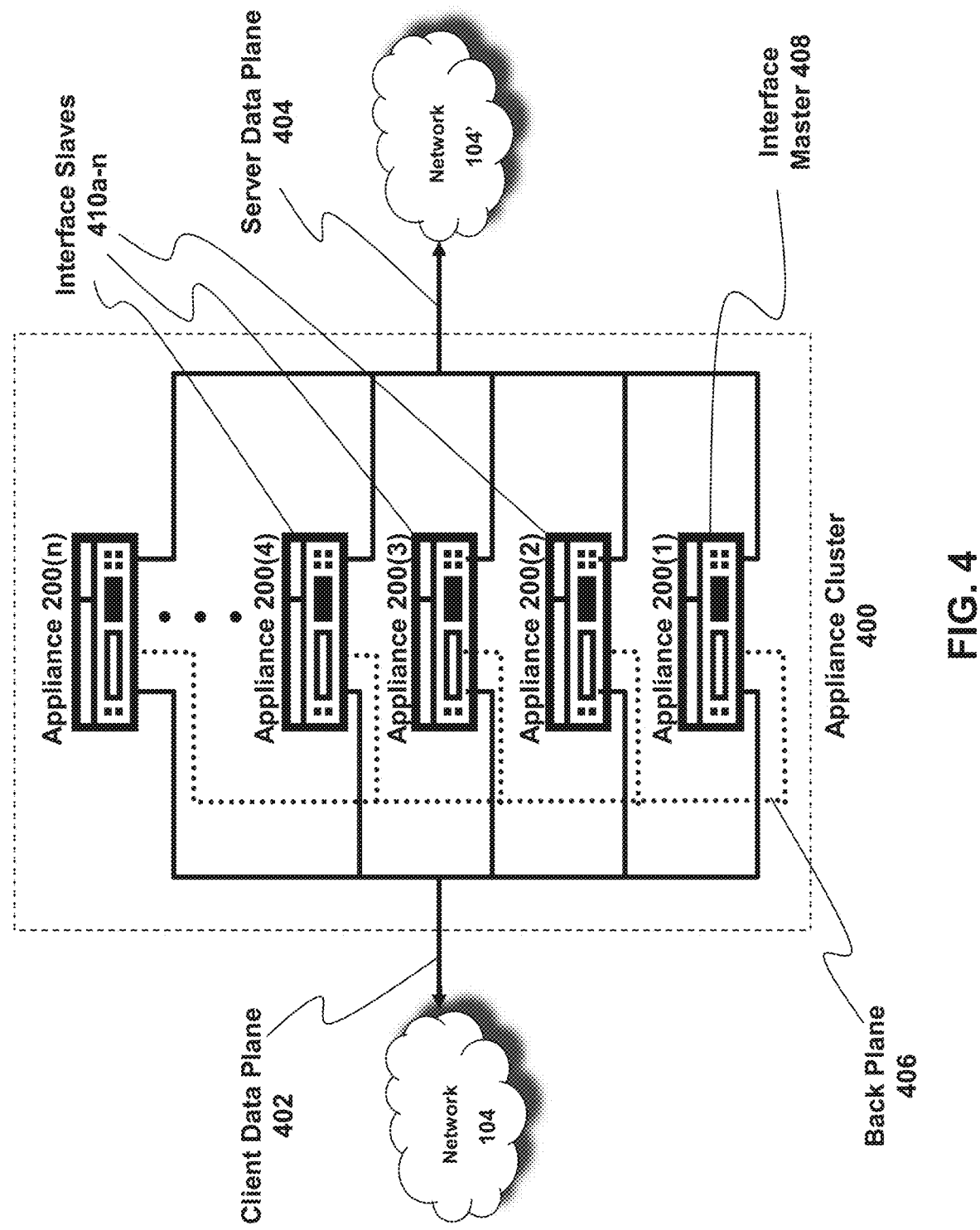
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205. The cluster 400 may include an interface master 408 and one or more interface slaves 410a-n. The interface master 408 may distribute traffic across the appliances 200 including the interface master 408 and the one or more interface slaves 410a-n of the cluster 400.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Invalidating Domain Name System (DNS) Cache Entries Based On Changes in Internet Protocol (IP) Families A computing device, such as a mobile device, can include multiple network interfaces through which the mobile device can communicate with other devices or servers via one or more networks. Different networks can use different Internet Protocol (IP) families, for instance, IP version 4 or IP version 6, among others. The network interfaces of such computing devices can also communicate on networks using different IP families. When a device attempts to access a website, the device can use a domain name system (DNS) cache maintained on the device to retrieve an IP address of the website. The IP address stored in the DNS cache may become invalid if the network interface changes. In some embodiments, the network interface can change responsive to a change in a network condition of a network with which the device is connected. For example, if the device is connected to a cellular network and the device either moves to an area where the signal strength of the cellular network falls below a threshold or does not exist or for some reason, the cellular signal is no longer available. In another example, the device can be connected to a WiFi connection and the device moves to an area where the signal strength of the WiFi network falls below a threshold or does not exist or for some reason, the WiFi signal is no longer available (for instance, if the WiFi router is switched off or disconnected).

The present disclosure is directed to solving problems related to DNS cache entry validation. DNS cache entries are stored in a DNS cache of the device, which can be a table including a plurality of DNS cache entries. A DNS cache entry stored in the DNS cache may become invalid if the network interface of the device changes. The DNS cache entry can remain valid when the network interface of the device switches to a network that has the same IP family. For instance, if the network interface of the device switches from a network having an IP family of IPV4 to another network having an IP family of IPV4 or from a network having an IP family of IPV6 to another network having an IP family of IPV6. However, the DNS cache entry can become invalid when the network interface switches from a network having an IP family of IPV4 to a network having an IP family of IPV6 or from a network having an IP family of IPV6 to a network having an IP family of IPV4. Also, some networks can support both an IP family of IPV4 and IPV6. In some such cases, to minimize the number of DNS requests over the network and use the DNS cache as much as possible, there is a benefit to validating the DNS cache entries in the DNS cache during transitions of networks. Although the present disclosure describes two IP families, IPV4 or IPV6, it should be appreciated that other types of IP families are contemplated, including future versions of IP families.

To address the problems related to DNS cache entry validation, the present disclosure describes systems and methods for determining a validity of DNS cache entries based on changes in IP families. The present disclosure provides systems and methods for DNS cache entry validation for mobile devices, which can efficiently determine whether the DNS cache entry is valid or not when the device moves from one network to another. With this algorithm, the unnecessary cost of DNS lookups by making a network request can be avoided and invalid DNS entry is flushed as needed.

In particular, the present disclosure describes devices that can be configured to detect the change in a network interface of the device and responsive to the change in the network interface, check whether the DNS cache entry is valid. Doing so can avoid experiencing performance issues. For instance, invalidating the DNS cache entry when the DNS cache entry is still valid can cause performance issues because doing so would require the device to perform a DNS lookup over the network. Similarly, using an invalid DNS cache entry can potentially cause the network request to fail in situations when an IP address of a different IP family is used on a network, for instance, when an IPV6 address is used on an IPV4 network or vice-versa.

The present disclosure describes systems and methods that reduce the number of DNS cache misses, while also performing DNS cache invalidation. In some embodiments described herein, DNS cache miss will occur at most once when there is a change of network interface or a change of IP family on a network interface that supports multiple IP families.

According to aspects of the present disclosure, the systems and methods described herein can be configured to cause a device to identify a change in a network interface of the device or a change in an IP family and responsive to determining that a change in the IP family satisfies a cache flushing policy, causing the device to flush the DNS cache in accordance with the DNS cache flushing policy. The device can be configured to determine if there's a change in network state of the device. If so, the device can validate the cache entry to avoid performing an unnecessary DNS look up on the network. Furthermore, with network interfaces of devices capable of supporting multiple IP families, such as both IPV4 and IPV6, there is an additional challenge to validate the DNS cache or respective DNS cache entries of the DNS cache when on a network interface that supports both the IP families. The present disclosure describes systems and methods that can validate DNS cache entries and update the DNS cache entry and the DNS cache accordingly.

In some embodiments, a device can be configured to retrieve all the routable IP addresses for both a first network interface, for example, a WiFi network interface and a second network interface, for example, a cellular network interface. If the device is connected to a network via the WiFi interface and if the cellular interface is found, the device is configured to disregard the IP address and IP family of the cellular interface as the WiFi network interface is given preference over the cellular network interface. The device is configured to assign, designate or otherwise consider the WiFi network interface to be the active interface.

Furthermore, if a network interface supports both the IP families (i.e. IPv4 and IPv6), then it can be difficult to determine which IP family is being used. In that case, the device can be configured to always flush the DNS cache a single time. As soon as the network interface stops supporting one of the IP families, the device can be configured to detect that the network interface stopped supporting one of the IP families and further be configured to flush the DNS cache.

In the case where the network interface changes but the IP family remain the same (i.e., change from Wifi_IPV4 to Cellular_IPV4 or change from Wifi_IPV6 to Cellular_IPV6 and vice-versa), the device is configured to not flush the DNS cache because the cached DNS IP family (or DNS cache entries belonging to the IP family) is still consistent with the routable IP family.

In one aspect, this disclosure is directed to a system. The system may include a device having a plurality of network interfaces configured to communicate using a plurality of internet protocol (IP) families. The device can be configured to maintain a cache storing domain name system (DNS) information. The device can be configured to detect a change from the device using a first IP family of the plurality of IP families to a second IP family of the plurality of IP families. The device can be configured to flush the cache in response to the detection.

Figure 5A:
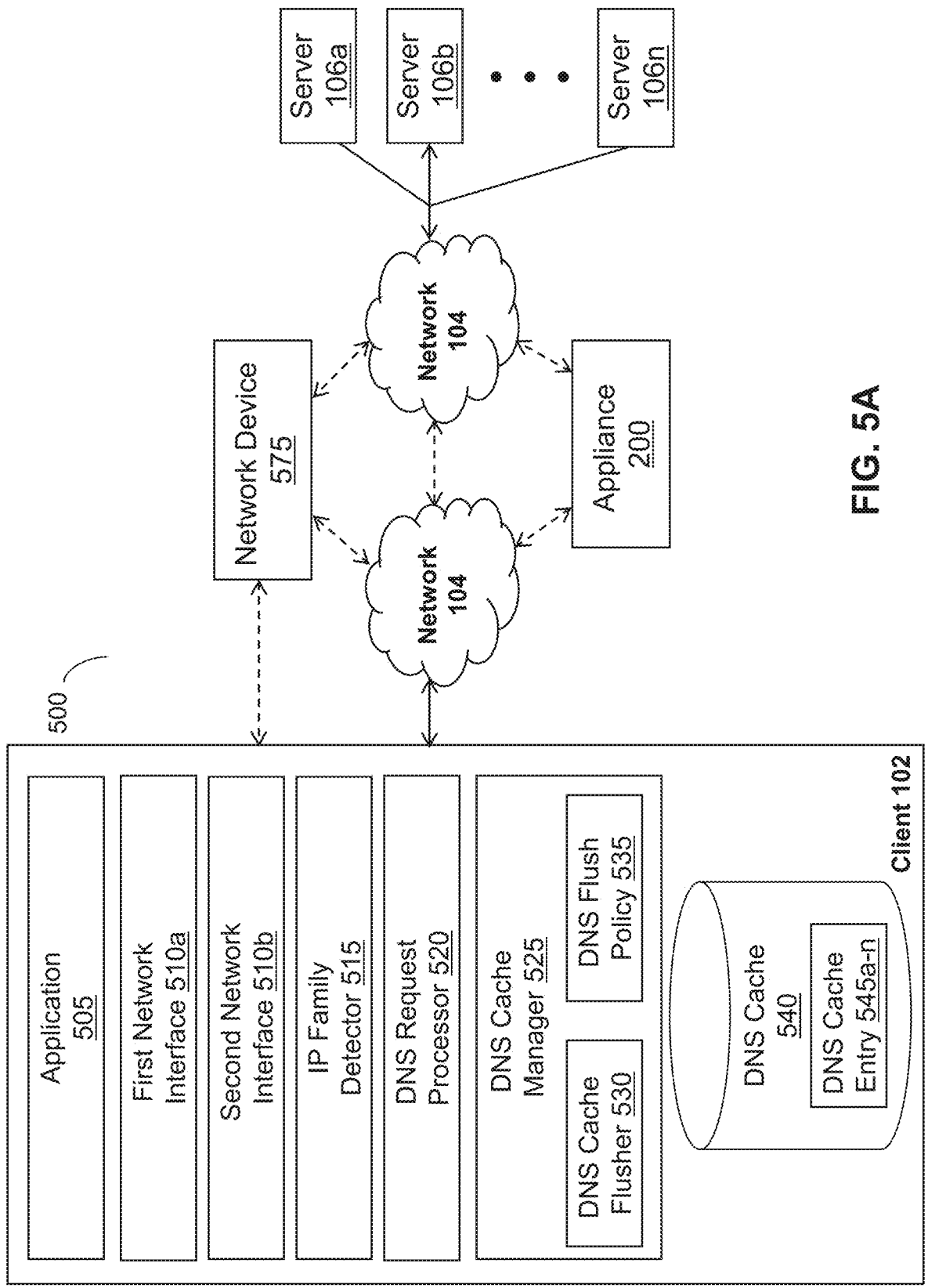
FIG. 5A is a block diagram of an embodiment of a system for invalidating domain name system (DNS) cache entries based on changes in interne protocol (IP) families.

Referring now to FIG. 5A, depicted is a system 500 for invalidating domain name system (DNS) cache entries based on changes in internet protocol (IP) families. Invalidating a DNS cache entry can correspond to identifying that the DNS cache entry is no longer valid, thereby causing removal of the DNS cache entry from a DNS cache. In overview, the system 500 may include one or more clients 102a-n (hereinafter generally referred to as clients 102 as shown in FIG. 5A), one or more appliances 200 and one or more servers 106a-n (hereinafter generally referred to as servers 106) communicating over one or more networks 104. The client 102 can be a computing device configured to communicate with one or more servers either directly (bypassing the appliance 200) or via the appliance 200. In some embodiments, the client 102 can be a mobile computing device, such as a smartphone, laptop, tablet, smart watch, among others. In some other embodiments, the client 102 can be any computing device, including desktops, or other computing devices that can communicate over one or more networks. The appliance can be an appliance similar to the appliances 200 described above with respect to Sections B-D.

The client device 102 can include one or more applications 505, a first network interface 510a, a second network interface 510b, an IP family detector 515, a DNS request processor 520, and a DNS cache manager 525 including a DNS cache flusher 530 and one or more DNS flush policies 535. The client 102 can also include at least one DNS cache 540 that can store one or more DNS cache entries 545a-n (hereinafter generally referred to as DNS cache entries 545). The server 106 can be a server from which the client device 102 can access data. In some embodiments, the server 106 can be an appliance, such as the appliance 200 described above with respect to Sections A-D. In some embodiments, the server 106 can be a server, such as the appliance 106 described above with respect to Sections A-D.

The systems and methods of the present solution may be implemented in any type and form of device, including clients, servers and/or appliances. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The one or more applications 505 can be applications configured to communicate with one or more servers 106 via one or more networks 104. The application 505 can be installed on the client device 102 and configured to execute within an operating system of the client 102. In some embodiments, the application 505 can be a browser configured to access one or more websites. In some embodiments, the application 505 can include one or more software development kits (SDKs), which can provide additional functionality to the application. In some embodiments, the application can include an SDK provided by an enterprise solution that allows for remote management of the client 102, applications 505 executing on the device 102, and data. In some such embodiments, the SDK can inject enterprise functionality into one or more preexisting applications or applications developed by other application publishers different from the enterprise. The applications including the SDK can be hosted on a company's private app store, the Apple App Store, or the Google Play Store, among others.

To add enterprise functionality to mobile applications, the mobile applications can be wrapped with a toolkit, such as the SDK described above. The SDK can be an application container technology that enhances the client device experience and prepares applications for secure deployment by adding certain capabilities, which can include policies and settings, signed security certificates, and mobile app management code.

The application 505 can be configured to receive one or more requests to access one or more websites. In some embodiments, the request can be received via an interaction by a user of the client 102. In some embodiments, the request can be received over the network. In some embodiments, the application 505 can be configured to determine that the request identifies a website. In some embodiments, the website can include a domain name, a host name, a top-level domain name, or any combination thereof. The application 505 can be configured to determine an IP address of the website identified in the request. In some embodiments, responsive to the application 505 attempting to determine an IP address of the website identified in the request, the operating system or the client 102 can be configured to determine the IP address of the website from the DNS cache 540. The client 102 can query the DNS cache 540 using the website or any portion of the website to determine the IP address. If the DNS cache 540 does not have a DNS cache entry 545 corresponding to the query, the client 102 can send a request to a network device 575, such as a router with which the client is communicating to determine the IP address. In some embodiments, the router 575 may retrieve the IP address from a cache of the router 575 or from another network device corresponding to a Domain Name System, which can be a database that stores all of the domain names and corresponding IP numbers for a particular top-level domain (TLD) such as .com or .net. The Domain Name System identifies and locates computer systems and resources on the Internet. For instance, when a Web address, or URL is included in a query, the DNS will match the Web address or URL included in the query with the IP address for that location and return the IP address to access the website corresponding to the Web address or URL.

The client 102 can include a plurality of network interfaces, including the first network interface 510a and the second network interface 510b. In some embodiments, the plurality of network interfaces includes a cellular network interface and a wireless network interface. In some embodiments, the cellular network interface can include a chip configured to establish communications via cellular base stations. In some embodiments, the wireless network interface can include a WiFi radio for establishing a WiFi connection. In some embodiments, the network interface can include any other network interface through which the client 102 can establish a network connection.

The client 102 can maintain, manage, assign or be assigned one or more IP addresses for each of the plurality of network interfaces, including the first network interface 510*a* and the second network interface 510*b*. In some embodiments, the first network interface 510*a* can be assigned a first IP address in a first IP family corresponding to a particular IP version, for instance, IP version 4 (IPv4) and a second IP address in a second IP family corresponding to a particular IP version, for instance, IP version 6 (IPv6). In some embodiments, the device can be configured to keep one of the IP addresses assigned to a network interface active at a given time. In some embodiments, the client 102 can be configured to keep one of the IP addresses across all of the plurality of network interfaces active at a given time. In some embodiments, the client 102 can determine which IP address of which network interface to keep active. In some embodiments, the client 102 can determine this based on the connection strengths established via each of the network interfaces. In some embodiments, the client 102 can determine this based on one or more preferences, settings, or policies for selecting which IP address of which network interface to keep active.

In some embodiments, the plurality of IP families includes at least IP version 4 (IPv4) family and IP version 6 (IPv6) family. In some embodiments, the IP family detector 515 can be configured to determine an IP family from a plurality of IP families (such as IPv4 and IPv6). IPv4 (Internet Protocol Version 4) is the fourth revision of the Internet Protocol (IP) used to identify devices on a network through an addressing system. The Internet Protocol is designed for use in interconnected systems of packet-switched computer communication networks. IPv4 uses a 32-bit address scheme allowing for a total of $2^{32}$ addresses (just over 4 billion addresses).

An IP address is represented as binary numbers but can be stored as text for human readers. For example, a 32-bit numeric address (IPv4) is written in decimal as four numbers separated by periods. Each number can be zero to 255. For example, 1.150.13.230 could be an IP address. IPv6 addresses are 128-bit IP address written in hexadecimal and separated by colons. An example IPv6 address could be written as: 1fce:1700:4565:2:120:34df:fe22:47cb.

The IP family detector 515 can be configured to determine an IP family from a plurality of IP families. The IP family detector 515 can determine which network interface is currently active and the IP family that is being used to connect over the network 104. The IP family detector 515 can determine which network interface is currently active by performing one or more operating system calls. For instance, the operating system call can be a call used to determine a route of any traffic to the appliance 200 or the servers 106. The IP family detector 515 can also determine which IP family the active network interface is using by performing one or more operating system calls. In some embodiments, the same operating system call can be used to determine both the active network interface and the IP family the active network interface is using.

In some embodiments, the client 102 is further configured to detect a switch from using a first network interface of the plurality of network interfaces to a second network interface of the plurality of network interfaces. The IP family detector 515 can include one or more event listeners to determine if the client 102 has switched network interfaces. For instance, the IP family detector 515 can include one or more event listeners to determine if the client 102 has switched from the first network interface 510*a* to the second network interface 510*b* or vice versa. An event listener can be a script, program, set of instructions, or other software and/or hardware construct that can be configured to detect the occurrence of an event, such as detecting if the client 102 has switched from the first network interface 510*a* to the second network interface 510*b* or vice versa. Depending on the operating system of the client 102, different types of commands can be used to determine the active network interface as well as the IP family that the active network interface is using. In some embodiments, the client 102 can detect a switch between network interfaces via the event listeners. In some embodiments, the client 102 can detect a switch by polling for the active network interface and comparing the network interface identified in the response to a last known network interface determined from a previous response. If the network interface identified in the response is different from the last known network interface determined from a previous response, the client can determine that the network interface has changed (or detect a switch between network interfaces).

The IP family detector 515 can determine the IP family of the active network interface by making one or more operating system calls. In some embodiments, the operating system call can include a call to access or view or return properties of at least one network interface. In some embodiments, the operating system call can include a call to access or view or return properties of each of the network interfaces of the client 102. In some embodiments, the IP family detector 515 can determine one or more IP addresses from the properties of the network interfaces returned by the client 102. In some embodiments, the properties of the network interfaces can identify the active network interface as the default network interface and the IP address used by the active network interface as the default network interface. In some embodiments, the response to the operating system call can identify an IP address associated with the active network interface. The IP family detector 515 can determine, from the IP address returned via the operating system call, a IP family of the IP address. The IP family detector 515 can determine the IP family of the IP address based on a format of the IP address. For instance, the IP family detector 515 can determine that the IP address matches a syntax corresponding to the IPv4 addressing scheme (for example, 1.150.13.230) or a syntax corresponding to the IPv6 addressing scheme (for example, 1fce:1700:4565:2:120:34df:fe22:47cb).

In situations where the client 102 switches from the first network interface 510*a* to the second network interface 510*b*, the IP family detector 515 can be configured to detect that an IP family used by the second network interface 510*b* remained the same as an IP family used by the first network interface 510*a* between the switch from using the first network interface 510*a* to the second network interface 510*b*. The IP family detector 515 can determine this by comparing the syntax or format of the IP address used by the second network interface 510*b* to the syntax or format of the IP address used by the first network interface 510*a* and determining that the syntax or format is the same. Conversely, the IP family detector 515 can detect that the first IP family used by the first network interface 510a changed to the second IP family used by the second network interface 510b between the switch from using the first network interface to the second network interface by comparing the syntax or format of the IP address used by the second network interface 510b to the syntax or format of the IP address used by the first network interface 510a and determining that the syntax or format has changed.

The client 102 includes the DNS request processor 520, which is configured to process DNS requests. In some embodiments, the DNS request processor 520 can be configured to determine that an application executing on the client 102, such as the application 505 is attempting to determine an IP address. The DNS request processor 520 can be invoked by the application 505 or can intercept a DNS query to the DNS cache generated by the application 505. The DNS request processor 520 can determine a domain name for which an IP address is requested and perform the lookup in the DNS cache stored on the client 102. The DNS request processor 520 can further be configured to send a DNS request to one or more network devices 575, for example routers or other devices on the network to determine an IP address for the domain name requested via the application 505. The DNS request processor 520 can communicate with, be included within or include the DNS cache manager 525. The DNS cache manager 525 can update the DNS cache 540 based on IP addresses the DNS request processor 520 receives from the one or more network devices 575, for example routers or other devices on the network.

The DNS cache manager 525 includes the DNS cache flusher 530 and one or more DNS flush polices 535. The DNS cache manager 525 can be configured to manage the DNS cache 540. The DNS cache manager 525 can communicate with the DNS request processor 520 and return IP addresses stored in one or more DNS cache entries 545 included in the DNS cache 540 responsive to a request from the DNS request processor 520.

The DNS cache manager 525 can be configured to maintain DNS cache entries 545 in the DNS cache 540. Each DNS cache entry 545 can store an IP address in a particular IP family. For instance, the DNS cache entry 545a can store an IP address in the IPv4 format or the IPv6 format. When a query for a particular domain name is made to the DNS cache, the response to the query can identify an IP address (assuming there is a corresponding entry in the DNS cache) in either an IPv4 IP family or an IPv6 IP family. As such, if the IP address returned does not match the IP family (or is not compatible with the IP family) used by the active network interface, the IP address will result in the application making a request using an invalid IP address, which results in an error in the application.

To avoid repeatedly providing the wrong IP addresses to the application 505, the DNS cache manager 525 can determine to flush the DNS cache 540. Details regarding the flushing the DNS cache and the DNS flush policy as described herein.

The DNS cache flusher 530 can be configured to flush the DNS cache 540. In some embodiments, the DNS cache flusher 530 can be configured to cause the client 102 to flush the DNS cache entries 545 included in the DNS cache 540. In some embodiments, flushing the DNS cache includes removing DNS cache entries from the DNS cache. In some embodiments, the DNS cache flusher 530 can be configured to remove or delete one or more DNS cache entries. In some embodiments, the DNS cache flusher 530 can be configured to remove or delete all of the DNS cache entries in the DNS cache 540. In some embodiments, the DNS cache flusher 530 can be configured to delete or remove only those DNS cache entries that correspond to a particular IP family that does not match the IP family of the active network interface 410a or 410b of the client 102. In some embodiments, the DNS cache flusher 530 can be configured to flush the DNS cache 540 in accordance with a DNS flush policy 535.

The DNS flush policy 535 can include one or more rules according to which the DNS cache flusher 530 can flush the DNS cache 540. The rules can identify conditions, which when met or satisfied, would trigger the DNS cache flusher 530 to flush the DNS cache 540. In some embodiments, the DNS flush policy 535 can include rules to flush the DNS cache 540 if the current network to which the active network interface is of an IP family that is different from the IP family of the previous network to which the same network interface or different network interface was connected.

The table below is an example DNS flush policy including a previous network's IP family, a current network's IP family and an action to take on the DNS cache (i.e., flush or no flush).

TABLE 1

| Previous Network | Current Network | Flush/No Flush |
| --- | --- | --- |
| Wifi_IPV4 | Wifi_IPV4 Cellular_IPV4 | No Flush |
| Wifi_IPV4 | Wifi_IPV6 Wifi_IPV4IPV6 Cellular_IPV6 Cellular_IPV4IPV6 | Flush |
| Cellular_IPV4 | Wifi_IPV6 Wifi_IPV4IPV6 Cellular_IPV6 Cellular_IPV4IPV6 | Flush |
| Wifi_IPV6 | Wifi_IPV6 Cellular_IPV6 | No Flush |
| Wifi_IPV6 | Wifi_IPV4 Wifi_IPV4IPV6 Cellular_IPV4 Cellular_IPV4IPV6 | Flush |
| Cellular_IPV6 | Wifi_IPV4 Wifi_IPV4IPV6 Cellular_IPV4 Cellular_IPV4IPV6 | Flush |
| Wifi_IPV4IPV6 | Wifi_IPV4IPV6 | No Flush |
| Wifi_IPV4IPV6 | Wifi_IPV4 Wifi_IPV6 Cellular_IPV4 Cellular_IPV6 Cellular_IPV4IPV6 | Flush |
| Cellular_IPV4IPV6 | Cellular_IPV4IPV6 | No Flush |
| Cellular_IPV4IPV6 | Wifi_IPV4 Wifi_IPV6 Cellular_IPV4 Cellular_IPV6 Wifi_IPV4IPV6 | Flush |

In some embodiments, the DNS cache flusher 530 can be configured to flush the DNS cache 540 based on comparing the current network to the previous network. Responsive to determining that the current network does not match the previous network, the DNS cache flusher 530 can flush the DNS cache.

In some embodiments, the DNS cache flusher 530 can be configured to not flush the DNS cache 540 based on comparing the current network to the previous network. Responsive to determining that the current network matches the previous network, the DNS cache flusher 530 can maintain the DNS cache entries 540 in the DNS cache 540.

As such, the present disclosure describes that the client device 102 can maintain entries in the cache in response to detecting that an IP family used by the second network interface remained the same as an IP family used by the first network interface between the switch from using the first network interface to the second network interface.

In some embodiments, the device 102 is further configured to determine the first IP family used by the first network interface responsive to a first operating system call to determine the properties of the first network interface. The device 102 further can be configured to determine the second IP family used by the second network interface responsive to a second operating system call to determine the properties of the second network interface.

Figure 5B:
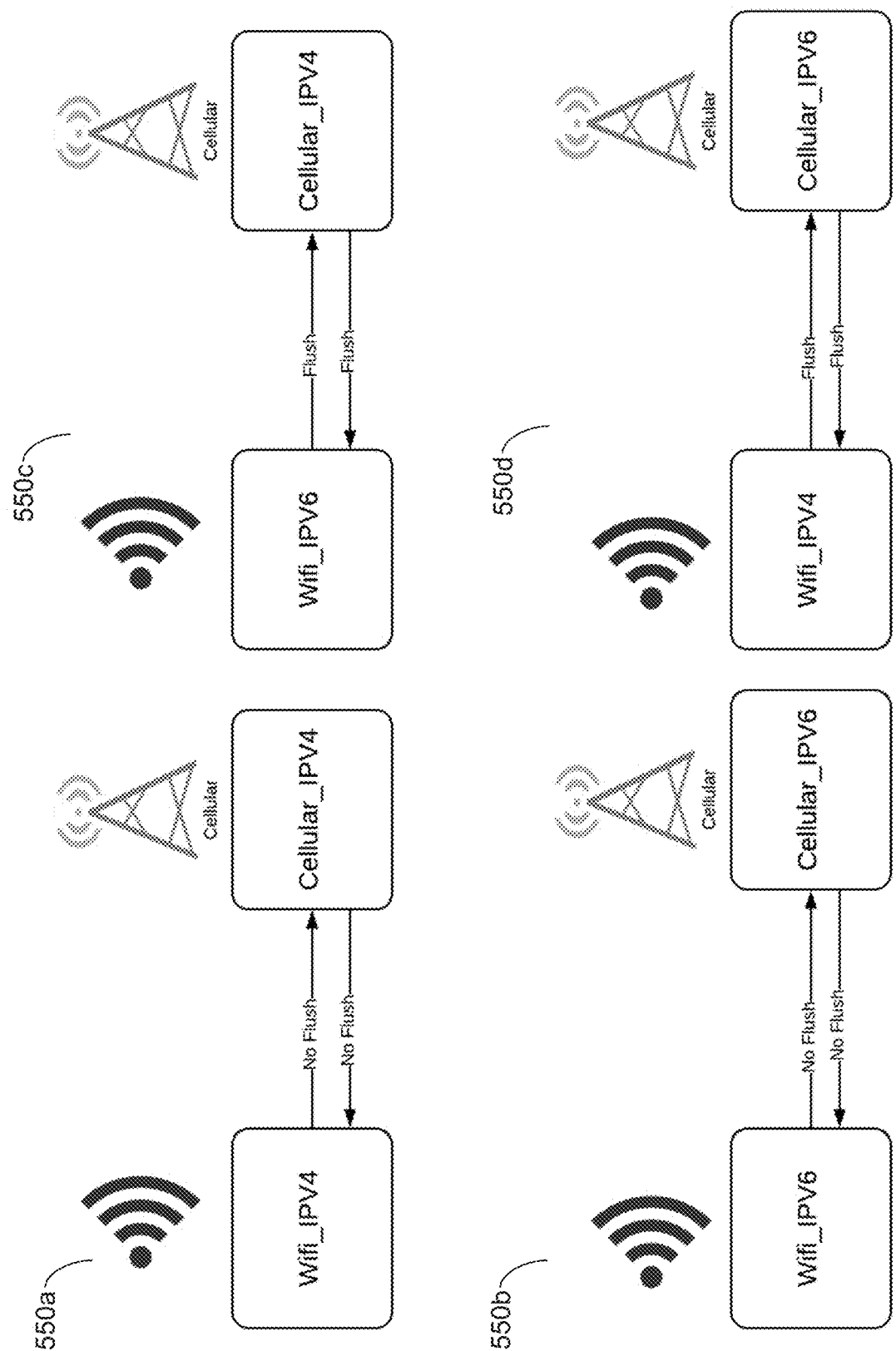
FIG. 5B is a communication diagram depicting sample scenarios for determining whether to flush a DNS cache based on changes in IP families.

Referring also to FIG. 5B, FIG. 5B is a communication diagram depicting sample scenarios for determining whether to flush a DNS cache based on changes in IP families. In the scenario 550a, if the network interface changes from WiFi to Cellular, but the IP family (for example, IPv4) of the network on which the WiFi network interface was active remains the same as the IP family (for example, IPv4) of the network on which the Cellular network interface was active, then the DNS cache manager 525 can determine to not flush the DNS cache 540. Similarly, if the network interface changes from Cellular to WiFi, but the IP family (for example, IPv4) of the network on which the Cellular network interface was active remains the same as the IP family (for example, IPv4) of the network on which the WiFi network interface was active, then the DNS cache manager 525 can determine to not flush the DNS cache 540.

In the scenario 550b, if the network interface changes from WiFi to Cellular, but the IP family (for example, IPv6) of the network on which the WiFi network interface was active remains the same as the IP family (for example, IPv6) of the network on which the Cellular network interface was active, then the DNS cache manager 525 can determine to not flush the DNS cache 540. Similarly, if the network interface changes from Cellular to WiFi, but the IP family (for example, IPv6) of the network on which the Cellular network interface was active remains the same as the IP family (for example, IPv6) of the network on which the WiFi network interface was active, then the DNS cache manager 525 can determine to not flush the DNS cache 540.

In the scenario 550c, if the network interface changes from WiFi to Cellular, but the IP family (for example, IPv6) of the network on which the WiFi network interface was active changes to the IP family (for example, IPv4) of the network on which the Cellular network interface was active, then the DNS cache manager 525 can determine to flush the DNS cache 540. Similarly, if the network interface changes from Cellular to WiFi, but the IP family (for example, IPv4) of the network on which the Cellular network interface was active changes to the IP family (for example, IPv6) of the network on which the WiFi network interface was active, then the DNS cache manager 525 can determine to flush the DNS cache 540.

In the scenario 550d, if the network interface changes from WiFi to Cellular, but the IP family (for example, IPv4) of the network on which the WiFi network interface was active changes to the IP family (for example, IPv6) of the network on which the Cellular network interface was active, then the DNS cache manager 525 can determine to flush the DNS cache 540. Similarly, if the network interface changes from Cellular to WiFi, but the IP family (for example, IPv6) of the network on which the Cellular network interface was active changes to the IP family (for example, IPv4) of the network on which the WiFi network interface was active, then the DNS cache manager 525 can determine to flush the DNS cache 540.

Figure 6:
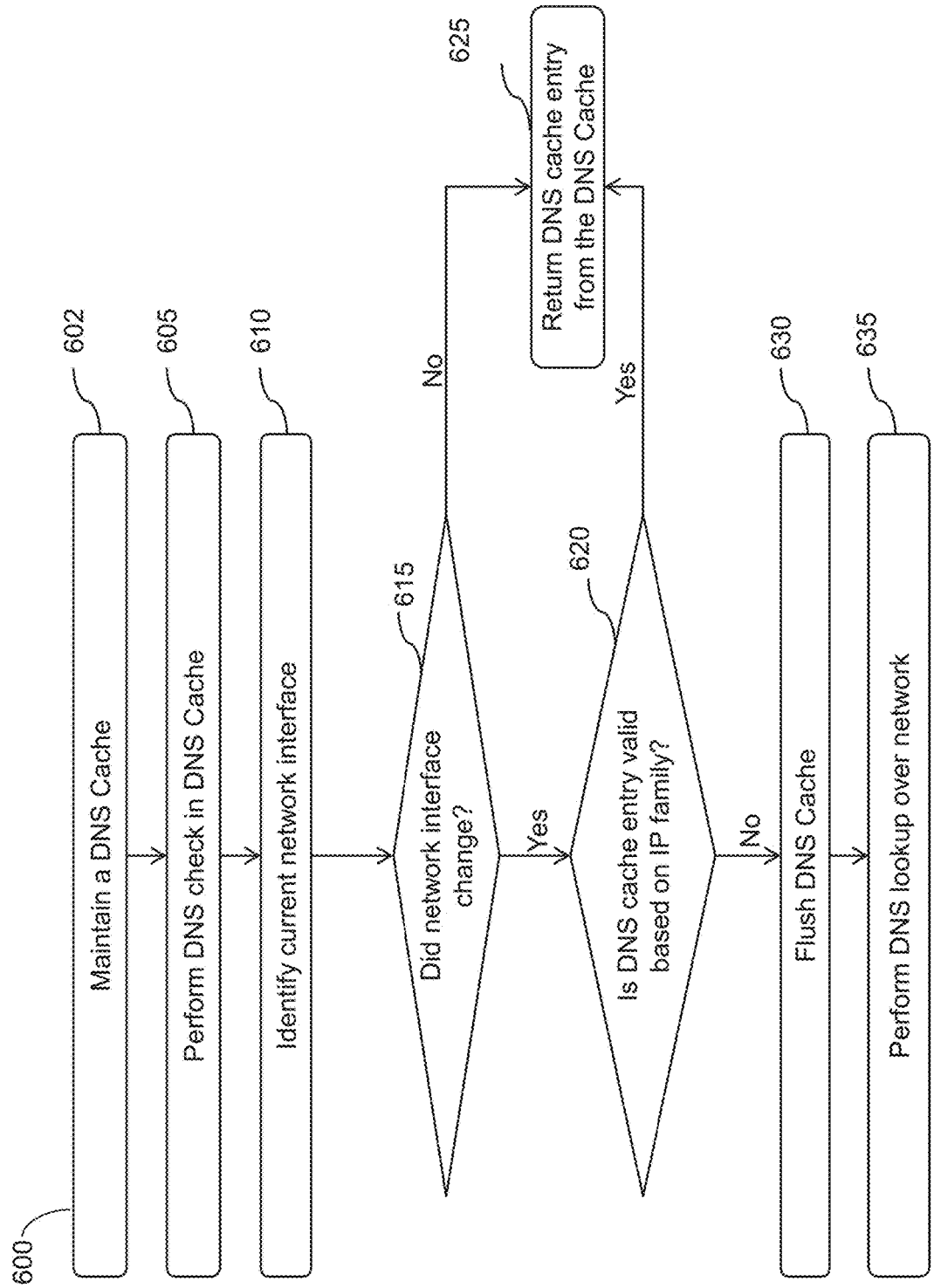
FIG. 6 is a flow diagram of an embodiment of a method for invalidating DNS cache entries based on changes in IP families.

Referring now to FIG. 6A, depicted is a flow diagram for a method 600 of preventing use by a mobile device of an IP address that corresponds to an invalid cache entry. In some embodiments, the method can be a method for invalidating domain name system (DNS) cache entries based on changes in internet protocol (IP) families. The functionalities of method 600 may be implemented using, or performed by, the components described in FIGS. 1-5B, such as the client 102. In brief overview, a client can maintain a cache storing domain name system (DNS) information (602). The client can perform a DNS check or verification of at least one entry in a DNS cache (605). The client can identify a current network interface (610). The client can determine if the network interface changed (615). If the network interface changed, the client can determine if a DNS cache entry is valid based on the change in the network interface (620). If the client determines that the IP family did not change or if the DNS cache entry is valid based on the change in the network interface, the client can return the DNS cache entry from the DNS cache (625). If the client determines that the DNS cache entry is not valid based on the change in the IP family, the client can flush the DNS cache (630). The client can then perform a DNS lookup over the network (635).

In further detail, a device, such as the client 102 can maintain a DNS cache storing DNS information of one or more IP addresses of a first IP family of the plurality of IP families used by the mobile device for a connection to a first network of the plurality of networks. A Domain Name System (DNS) cache is a temporary database that can be maintained by a computer and contains records of all the recent visits and attempted visits to websites and other internet domains. By using a DNS cache, the process of completing an entire DNS lookup will only need to occur the first time the device visits the site and upon subsequent requests, the device will use the cached DNS information until the information expires or is flushed.

The client 102 can perform a DNS check in a DNS cache (605). The client can receive one or more requests to access one or more websites. In some embodiments, the request can be received via an interaction by a user of the client 102. In some embodiments, the request can be received over the network. In some embodiments, the client can determine that the request identifies a website. In some embodiments, the website can include a domain name, a host name, a top-level domain name, or any combination thereof. The client can determine an IP address of the website identified in the request. In some embodiments, the client can determine the IP address of the website by performing a DNS check, for example from the DNS cache 540. A DNS check can involve the client accessing the DNS cache to determine if a DNS cache entry exists that identifies the website identified in the request.

In some embodiments, the device can be a mobile device, such as a smartphone, tablet, or other computing device configured to include one or more network interfaces. In some embodiments, the client can include a WiFi network interface and a cellular network interface. In some embodiments, the client can include a plurality of network interfaces including the WiFi network interface and the cellular network interface, among others. In some embodiments, the first network can use a signal type of one of cellular or wireless, such as WiFi, and the second network uses a different signal type from the first network. For instance, the second network can use one of wireless or cellular based on the signal type of the first network.

The client can identify a current network interface (610). The client can determine which network interface of the client is currently active. In some embodiments, the client can identify the network interface of the client corresponding to the DNS check is the current network interface. The current network interface may have IP addresses assigned for each of a plurality of IP families (or versions), such as a first IP address for an IPv4 family or a second IP address for an IPv6 family. The client can determine the IP addresses by determining the properties of one or more network interfaces of the client and determining the IP addresses assigned to the current network interface.

The client can determine if the network interface changed (615). The client can determine if the network interface changed since the client performed a previous DNS check. In some embodiments, the client can determine if the network interface changed by determining if a different network interface of the client is being used since the last time the client performed a check. In some embodiments, the client can switch between network interfaces of the client to access one or more resources based on a connection type or connection strength. In some embodiments, the client can switch between network interfaces of the client to access one or more resources based on a network interface selection policy. In some embodiments, the client can include or implement a network interface selection policy that prioritizes connecting to a network via a first network interface over a second network interface, for instance, connecting via WiFi instead of cellular if a connection via WiFi is available.

The client can determine if the network interface of the client switched from a first network interface to a second network interface. In some embodiments, the first network interface can be a WiFi network interface and the second network interface can be a cellular network interface. In some embodiments, the first network interface can be a cellular network interface and the second network interface can be a WiFi network interface. In some embodiments, the first or second network interface can be a wired network interface, such as an Ethernet. In some embodiments, the first or second network interface can be a short range wireless network interface, such as Bluetooth. In some embodiments, the first or second network interface can be any network interface that can use an IP family, for instance, an IPV4 or IPV6 family. In the event that the client detects that the network interface has switched from the first network interface to the second network interface, the client can determine if the IP family used by the network to which the second network interface connects is the same as the IP family used by the network to which the first network interface was connected. Similarly, in the event that the client detects that the network interface has switched from the first network interface to the second network interface, the client can determine if the IP family used by the network to which the second network interface connects is different than the IP family used by the network to which the first network interface was connected.

In some embodiments, the client can determine if an IP family changed even if the network interface did not change. The client can determine if the IP family changed from a first IP family (for example, IPV4) to a second IP family (for example, IPV6) or vice versa even if the client is using the same network interface. This may occur if the IPV4 address is not functioning or if the client detects some other condition that causes the client to switch from the first IP family to the second IP family.

In some embodiments, the client can determine if the IP family of the current connection is different from a previous IP family. In some embodiments, different connections established by the same network interface of the client or by two different network interfaces of the client can have different IP families or correspond to different IP families. In some embodiments, the client can determine if the IP family of a connection has changed from a previous connection. In some embodiments, the client can check if the IP family of a connection has changed from a previous connection each time an IP address for a website is to be determined by the client. As described herein, an IP family can correspond to an IP version. For example, IPv4 is a first IP family and IPv6 is a second IP family. In some embodiments, the client can determine the first IP family used by the first network interface responsive to a first operating system call to determine the properties of the first network interface. The client can also determine the second IP family used by the second network interface responsive to a second operating system call to determine the properties of the second network interface. The client can then compare the two IP families to see if the IP family changed.

If the IP family changed, the client can determine if a DNS cache entry is valid based on the change in the IP family (620). In some embodiments, the DNS cache entry can be determined to be invalid if the IP address returned by the DNS cache corresponds to an IP family that does not match the IP family of the network corresponding to the active network interface. Conversely, the DNS cache entry can be determined to be valid if the IP address returned by the DNS cache corresponds to a IP family that matches the IP family of the network corresponding to the active network interface. In some embodiments, the client can apply a DNS flush policy to determine whether or not to flush the DNS cache based on the validity of the DNS cache entries or based on whether the IP family of the network is the same or different from the IP family stored in the DNS cache.

If the client determines that the IP family did not change or if the DNS cache entry is valid based on the change in the IP family, the client can return the DNS cache entry from the DNS cache (625). The client can determine to return the IP address determined from the DNS cache if the IP address is determined to be valid. The client device can determine that the IP address is valid based on determining that the IP family of the IP address matches the IP family of the current network. In some embodiments, the client can maintain entries in the DNS cache in response to detecting that an IP family used by the second network interface remained the same as an IP family used by the first network interface between the switch from using the first network interface to the second network interface.

If the client determines that the DNS cache entry is not valid based on the change in the IP family, the client can flush the DNS cache (630). The client can determine that the IP address is not valid based on determining that the IP family of the IP address does not match the IP family of the current network. In some embodiments, the client can determine to flush the cache based on a cache flushing policy. The cache flushing policy can include one or more rules according to which to flush the DNS cache.

In some embodiments, the client can flush the DNS cache entries 545 included in the DNS cache 540. In some embodiments, flushing the DNS cache includes removing DNS cache entries from the DNS cache. In some embodiments, the client can remove or delete one or more DNS cache entries. In some embodiments, the client can remove or delete all of the DNS cache entries in the DNS cache 540. In some embodiments, the client can delete or remove only those DNS cache entries that correspond to a particular IP family that does not match the IP family of the active network interface 410*a* or 410*b* of the client 102. In some embodiments, the client can flush the DNS cache 540 in accordance with the DNS flush policy.

The DNS flush policy can include one or more rules according to which the client can flush the DNS cache. The rules can identify conditions, which when met or satisfied, would trigger the client to flush the DNS cache. In some embodiments, the DNS flush policy can include rules to flush the DNS cache if the current network to which the active network interface is of an IP family that is different from the IP family of the previous network to which the same network interface or different network interface was connected.

The client can then perform a DNS lookup over the network (635). Responsive to determining that the IP address is invalid, the client can perform a DNS lookup over the network to determine the correct IP address. The client can send a request to one or more routers to determine an IP address corresponding to the website to which the client received a request to access. The client can obtain an IP address via the network from either a router or other entity that has previously stored a correct IP address or from a Domain Name System that maintains the IP address of the website.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A system comprising:
a mobile device having one or more network interfaces configured to communicate over a plurality of networks using a plurality of internet protocol (IP) families, the mobile device configured to:
maintain a cache storing domain name system (DNS) information of one or more IP addresses of a first IP family of the plurality of IP families used by the mobile device for a connection to a first network of the plurality of networks;
detect a change in the connection of the mobile device from the first network using the first IP family to a second network of the plurality of networks, the second network using a second IP family of the plurality of IP families different from the first IP family; and
flush, in response to detection of the change in the connection of the mobile device from the first network to the second network, at least the DNS information of one or more IP addresses of the first IP family of the first network from the cache maintained by the mobile device to prevent use by the mobile device of an IP address that corresponds to an invalid cache entry.

2. The system of claim 1, wherein the first network uses a first signal type of one of cellular or wireless and the second network uses a second signal type different than the first signal type used by the first network.

3. The system of claim 1, wherein the one or more network interfaces comprises a cellular network interface and a wireless network interface.

4. The system of claim 1, wherein the plurality of IP families comprises at least IP version 4 and IP version 6.

5. The system of claim 1, wherein the mobile device is further configured to detect a switch from a first network interface of the one or more network interfaces using, for the first network, a first signal type of one of cellular or wireless to a second network interface of the one or more network interfaces using, for the second network, a second signal type different than the first signal type used by the first network interface.

6. The system of claim 5, wherein the mobile device is further configured to maintain entries in the cache in response to detecting that an IP family used by the second network interface remained the same as an IP family used by the first network interface between the switch from using the first network interface to the second network interface.

7. The system of claim 5, wherein to detect a change from the mobile device using the first IP family to the second IP family, the mobile device is further configured to detect that the first IP family used by the first network interface changed to the second IP family used by the second network interface between the switch from using the first network interface to the second network interface.

8. The system of claim 5, wherein the mobile device is further configured to:
 determine the first IP family used by the first network interface responsive to a first operating system call to determine the properties of the first network interface; and
 determine the second IP family used by the second network interface responsive to a second operating system call to determine the properties of the second network interface.

9. A method comprising:
 (a) maintaining, by a mobile device having one or more network interfaces configured to communicate over a plurality of networks using a plurality of internet protocol (IP) families, a cache storing domain name system (DNS) information of one or more IP addresses of a first IP family of the plurality of IP families used by the mobile device for a connection to a first network of the plurality of networks;
 (b) detecting, by the mobile device, a change in the connection of the mobile device from the first network using the first IP family to a second network of the plurality of networks using a second IP family of the plurality of IP families different from the first IP family; and
 (c) flushing, by the mobile device, in response to detection of the change in the connection of the mobile device from the first network to the second network, at least the DNS information of one or more IP addresses of the first IP family of the first network from the cache maintained by the mobile device to prevent use by the mobile device of an IP address that corresponds to an invalid cache entry.

10. The method of claim 9, wherein the first network uses a first signal type of one of cellular or wireless and the second network uses a second signal type different than the first signal type used by the first network.

11. The method of claim 9, wherein the one or more network interfaces comprises a cellular network interface and a wireless network interface.

12. The method of claim 9, wherein the plurality of IP families comprises at least IP version 4 and IP version 6.

13. The method of claim 9, further comprising detecting, by the mobile device, a switch from a first network interface of the one or more network interfaces using, for the first network, a first signal type of one of cellular or wireless to a second network interface of the one or more network interfaces using, for the second network, a second signal type different than the first signal type used by the first network interface.

14. The method of claim 13, further comprising maintaining, by the mobile device, entries in the cache in response to detecting that an IP family used by the second network interface remained the same as an IP family used by the first network interface between the switch from using the first network interface to the second network interface.

15. The method of claim 13, wherein (b) further comprises detecting that the first IP family used by the first network interface changed to the second IP family used by the second network interface between the switch from using the first network interface to the second network interface.

16. The method of claim 13, further comprising:
 determining, by the mobile device, the first IP family used by the first network interface responsive to a first operating system call to determine the properties of the first network interface; and
 determining, by the mobile device, the second IP family used by the second network interface responsive to a second operating system call to determine the properties of the second network interface.

17. A non-transitory computer readable medium storing program instructions for causing one or more processors to:
 maintain, on a mobile device having one or more network interfaces configured to communicate over a plurality of networks using a plurality of internet protocol (IP) families, a cache storing domain name system (DNS) information of one or more IP addresses of a first IP family of the plurality of IP families used by the mobile device for a connection to a first network of the plurality of networks;
 detect a change in the connection of the mobile device from the first network using the first IP family to a second network, of the plurality of networks, using a second IP family of the plurality of IP families different from the first IP family; and
 flush, in response to detection of the change in the connection of the mobile device from the first network to the second network, at least the DNS information of one or more IP addresses of the first IP family of the first network from the cache maintained by the mobile device to prevent use by the mobile device of an IP address that corresponds to an invalid cache entry.

18. The non-transitory computer readable medium of claim 17, wherein the first network uses a first signal type of one of cellular or wireless and the second network uses a second signal type different than the first signal type used by the first network.

19. The non-transitory computer readable medium of claim 17, wherein the one or more network interfaces comprises a cellular network interface and a wireless network interface.

20. The non-transitory computer readable medium of claim 17, storing program instructions for causing the one or more processors to detect a switch from a first network interface of the one or more network interfaces using, for the first network, a signal type of one of cellular or wireless to a second network interface of the one or more network interfaces using, for the second network, a different signal type than the first network interface.

* * * * *